June 26, 1934.  E. L. WATSON  1,964,611
SANITARY COMBINED RODENT AND INSECT EXTERMINATOR
Filed May 4, 1933   3 Sheets-Sheet 1

INVENTOR
E. L. WATSON
BY Lester L. Sargent
ATTORNEY

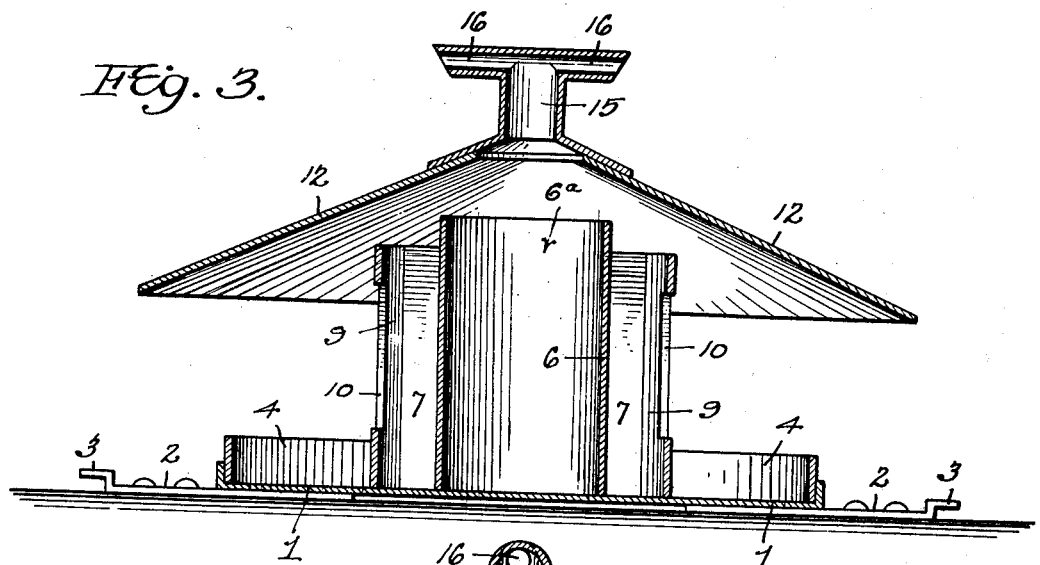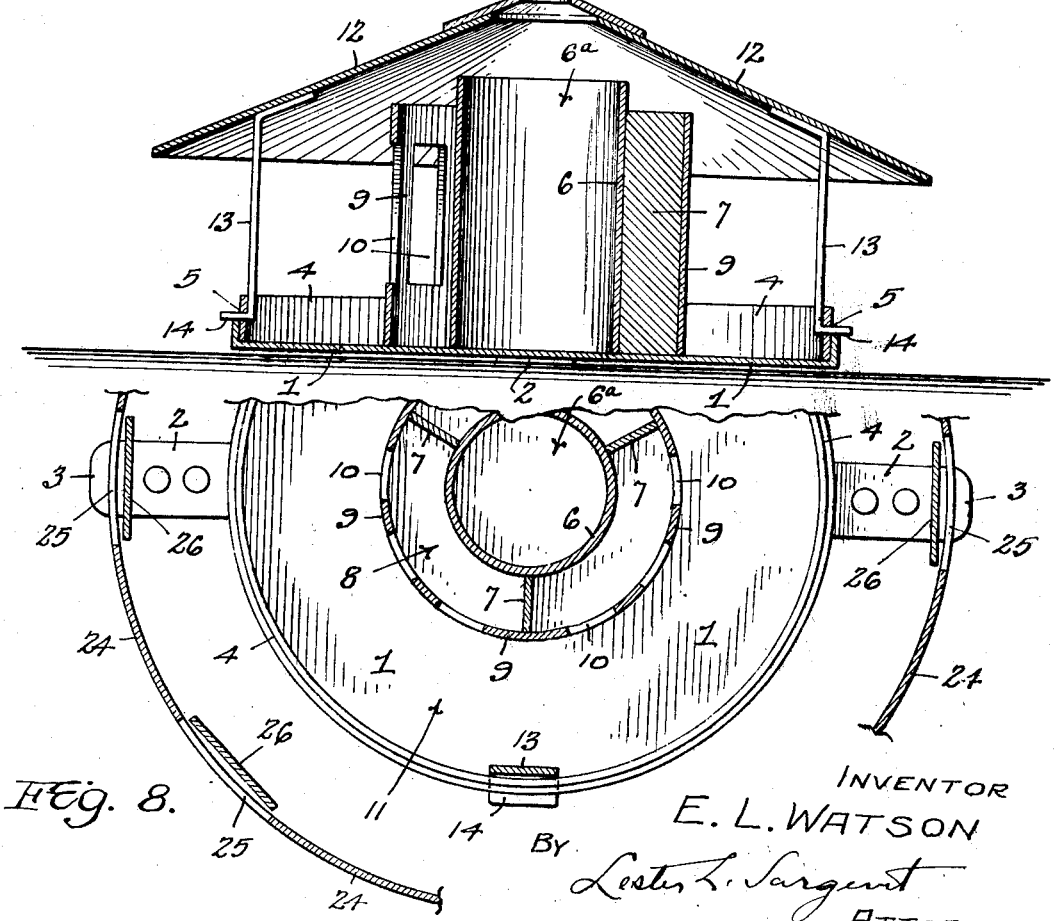

June 26, 1934.  E. L. WATSON  1,964,611
SANITARY COMBINED RODENT AND INSECT EXTERMINATOR
Filed May 4, 1933   3 Sheets-Sheet 3
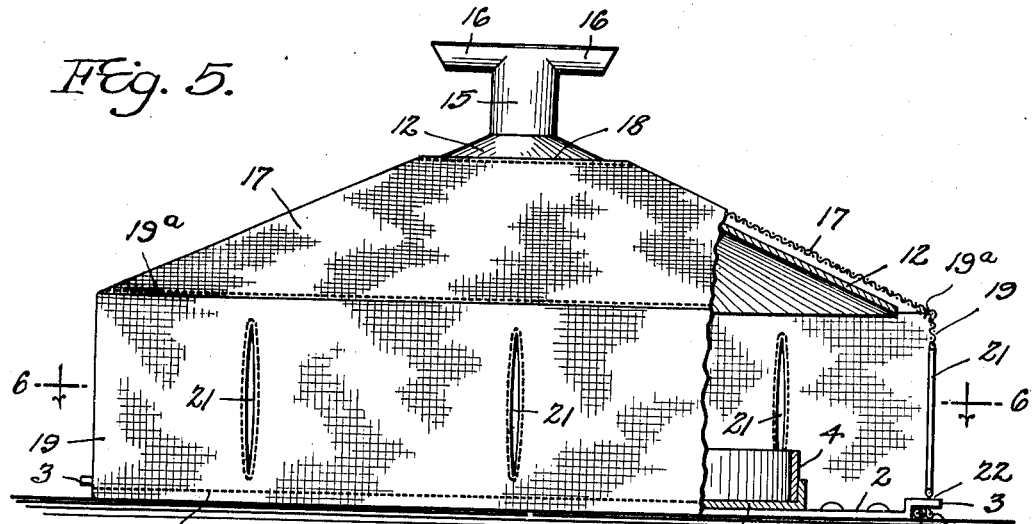
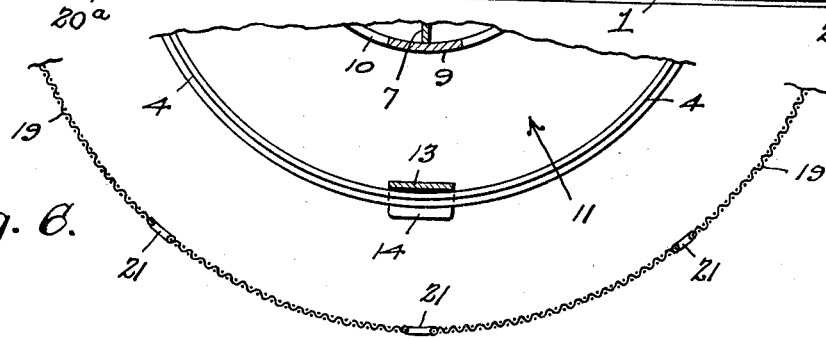
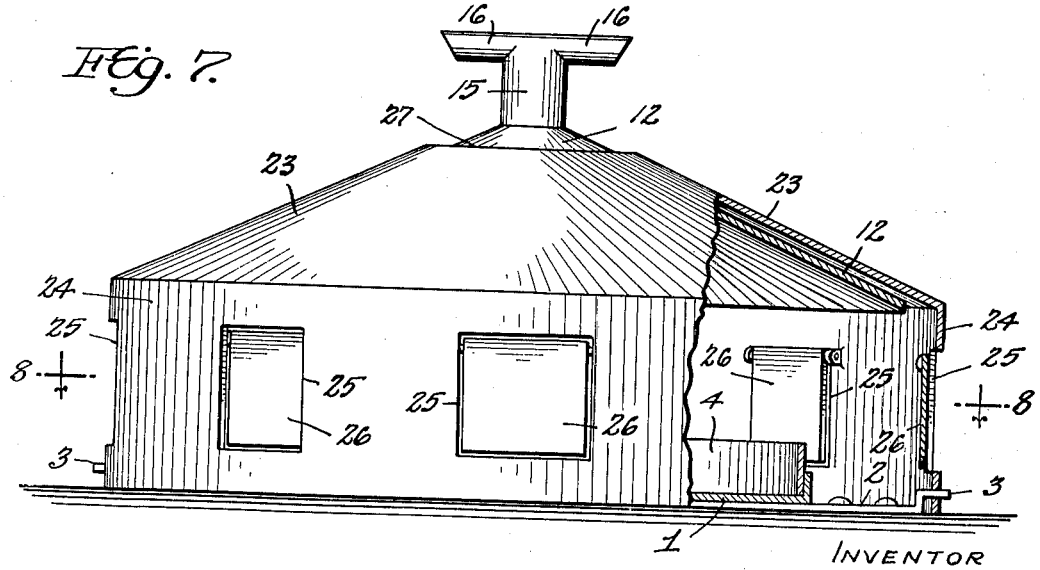
INVENTOR
E. L. WATSON
BY
ATTORNEY Patented June 26, 1934

1,964,611

UNITED STATES PATENT OFFICE 1,964,611

SANITARY COMBINED RODENT AND INSECT EXTERMINATOR

Edward L. Watson, Rochester, N. Y.

Application May 4, 1933, Serial No. 669,433

9 Claims. (Cl. 43—131)

The object of my invention is to provide an improved combined exterminator for rodents and insects adapted for either inside or outside use, to provide a device made of metal and suitable for use in poultry yards, warehouses, outbuildings and to provide means for fastening it to the floor or ground. It is also an object of my invention to provide novel means for permitting the entrance and departure of rodents from the device while preventing chickens from entering the device to obtain the poison. It is also an object of my invention to provide a device adapted to contain different varieties of bait for the rodents and to provide a device adapted to contain a lure in a separate compartment which will attract the rodents or insects, as the case may be to the device. I attain these and other objects of my invention by the apparatus shown in the accompanying drawings, in which—

Fig. 3 is a central vertical section on line 3—3 of Fig. 2;

Fig. 4 is a central vertical section on line 4—4 of Fig. 2;

Fig. 5 is a side elevation partly in central vertical section of a modified form of the device;

Fig. 6 is a fragmentary sectional plan view on the line 6—6 of Fig. 5;

Fig. 7 is a side elevation, partly in central vertical section of another modified form of the device; and Fig. 8 is a fragmentary sectional plan view on the line 8—8 of Fig. 7.

Like numerals designate like parts in each of the several views.

Figure 1:
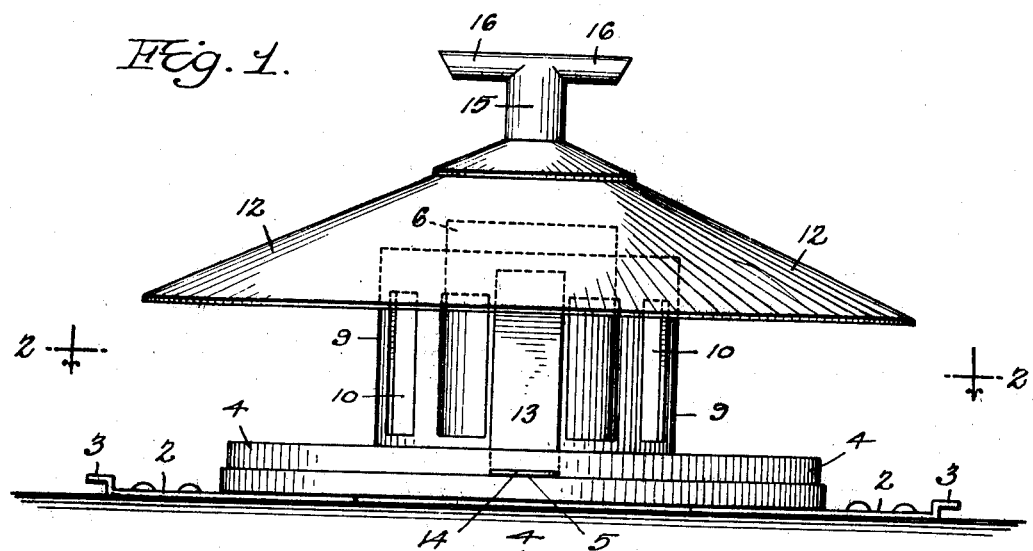
Figure 1 is a side elevation of my invention.

Referring to the accompanying drawings, I provide a metal base or bottom 1 having preferably integral anchoring arms or horizontal metal straps 2 extending from opposite portions of the member 1, the arms preferably having offset or raised ends 3. I provide opposite slots 5 spaced from the bottom of the annular rim 4. In the center of the device, I provide a lure compartment 6a formed by the cylindrical wall 6. Spaced from the cylindrical wall 6 I provide another cylindrical wall 9 with a plurality, preferably three partitions connecting walls 6 and 9 to form the poison bait compartments 8. I provide a series of openings or windows 10 in wall 9 to enable the rodents to gain access to the poison bait in compartments 8. Extending between wall 9 and rim 4 is a compartment 11 for insect poison.

I provide a metal canopy 12 of sufficient area to cover the entire apparatus and protect it from rain. Canopy 12 is supported by slightly resilient metal straps 13, which are provided with outturned or horizontal ends 14 adapted to releasably engage in the slots 5 in rim 3, as shown in the drawings. The canopy 12 is provided with a vertical vent 15 which opens into opposite lateral vents 16.

As shown in Figs. 5 and 6, I provide a fabric cover comprising a top fabric cover member 17 and a fabric depending annular side wall 19. The top fabric cover is provided with an elongated slot 18 to permit of placing the cover over the vents 15 and 16. This fabric cover member preferably is of canvas. I provide a metal ring or wire 20 to which the bottom edge of the annular fabric side wall 19 is secured and which gives shape to the side wall. I provide spaced vertical slits 21 in the fabric side wall 19. These slits extend from the top seam down to the hem at the bottom of the side wall. This hem 20a also holds the slits together and likewise the seam 19a at the top likewise holds the slits from opening further than intended. A function of these slits is to permit the entrance of rodents to the device while preventing chickens from gaining access to the poison bait compartments of the device.

Referring to Figs. 7 and 8, there is illustrated a modified form of invention having a metal cover 23 and an annular metal side wall 24, the side wall being provided with doorways 25 which in turn are provided with hinged doors 26, the doors being hinged at the top and adapted to swing both ways, as shown. The metal cover 23 is provided with an elongated central slot 27 to permit the cover to seat over the vents 16.

Figure 2:
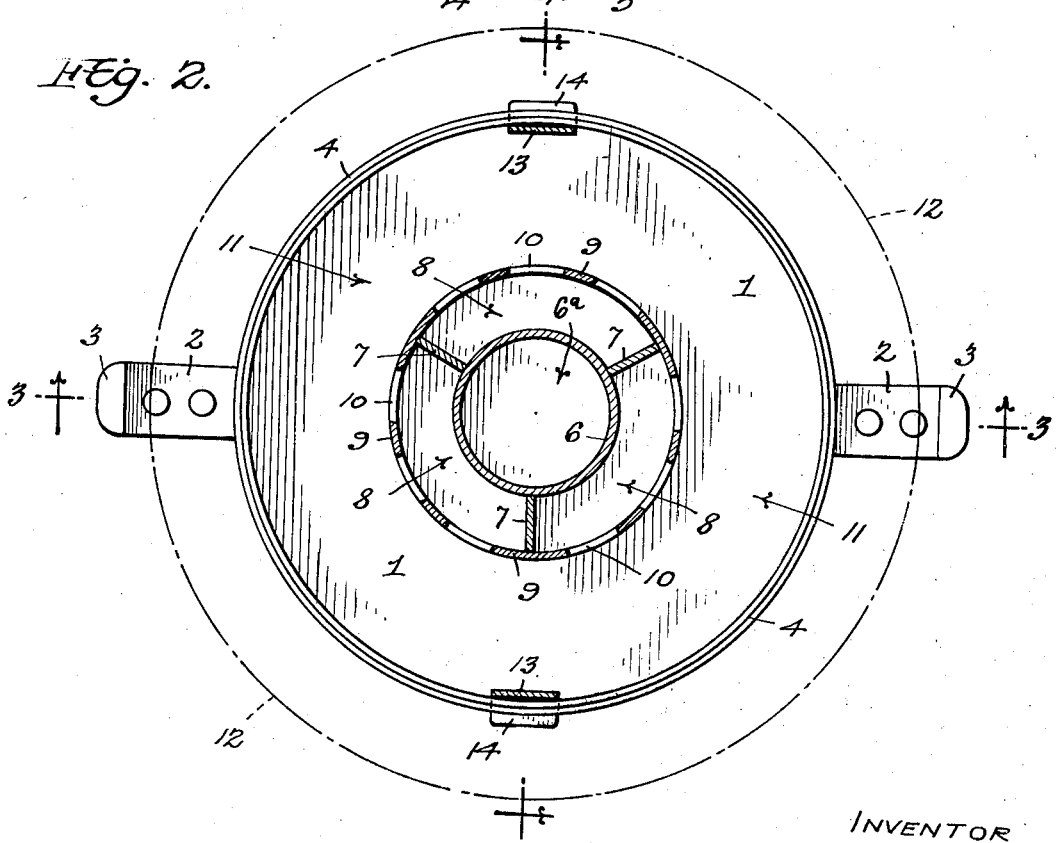
Fig. 2 is a sectional plan view on line 2—2 of Fig. 1.

In use the device is assembled by the same means and in the same manner as shown in Figs. 5 and 6 by inserting the ends 14 of metal straps 13 through the slits 5 in the rim 4 to mount the canopy over the bait and lure compartments. Before doing this in both forms of my invention as shown in Figs. 1-8 suitable lure to attract rodents is placed in the central compartment formed by walls 6 and suitable poison bait of which three different varieties may be used is placed in the compartments extending between partitions 7 outside of the lure compartment. A suitable insect exterminator liquid is placed in the outer compartment which extends from wall 9 to rim 4. The canopy is then covered by the fabric cover device and the side wall of the fabric is kept in place by inserting the preferably offset or raised ends 3 of the anchoring arms 2 through the horizontal slits 22 in the side wall 19 of the fabric covering device. The vertical slits 21 afford access to rodents to the interior of the device while effectively excluding chickens. The two horizontal metal straps 2 are suitably fastened to the floor or ground to hold the exterminator in place for poisoning rats and mice. The device may be removed during the day. The side wall 19 furnishes darkness for the rodent upon which they rely. The darkness also prevents chickens and birds from entering the exterminator and the size of the vertical slits in the fabric side wall also is calculated to exclude chickens. The central compartment 6a is to contain the lure or attracting odor to the rodents only. The outer compartments 8 are to contain the bait only. This bait contains the poison, which has a tendency to deodorize it. By providing a plurality of these compartments 8 the rodent is afforded a selection of bait as some rats are attracted more by certain kinds of bait and some rats by other kind of bait. The openings or windows 10 allow the rodents to reach the bait but are not large enough to allow the rodents to carry the poison bait away in chunks. The compartment 11 can be used as a container for liquid poison bait for flies or other insects. The device may be used as a rodent exterminator only; as an insect exterminator only; or as an exterminator for both rodents and insects.

The canopy 12 provides protection from the rain and sun thereby making the device weatherproof. The vents 15 and 16 provide proper ventilation for the lure compartment.

What I claim is:

1. In a sanitary combined rodent and insect exterminator the combination of a base, a central lure compartment, encircling bait compartments, said compartments being partitioned to permit of using different kinds of bait for rodents in the aforesaid compartments, said compartments having openings to permit access to the bait, an outer compartment for liquid insecticide, a canopy over the entire device, means for supporting the canopy, vents opening out of the top of the canopy, a cover for the canopy, said cover having an annular side wall encircling the device, and normally closed openings through the side wall for the admission and departure of rodents.

2. In a sanitary combined rodent and insect exterminator, the combination of a base, a central lure compartment, encircling bait compartments, said compartments being partitioned to permit of use of different kinds of bait for rodents in the aforesaid compartments, said compartments having openings to permit access to the bait, an outer compartment for liquid insecticide, a canopy over the entire device, means for supporting the canopy, vents opening out of the top of the canopy, a fabric cover for the canopy, the top portion thereof having a slot to permit of its being placed over the vents, the cover having an annular side wall, said side wall having a series of vertical slits to permit access by rodents to the interior of the device while excluding chickens, and means for retaining the side wall in proper position.

3. In a sanitary combined rodent and insect exterminator the combination of a base, a central lure compartment, encircling bait compartments, said compartments being partitioned to permit of using different kinds of bait for rodents in the aforesaid compartments, said compartments having openings to permit access to the bait, an outer compartment for liquid insecticide, a canopy over the entire device, means for supporting the canopy, vents opening out of the top of the canopy, a fabric cover for the canopy, the top portion thereof having a slot to permit of its being placed over the vents, the cover having an annular side wall, said side wall having a series of vertical slits to permit access by rodents to the interior of the device while excluding chickens, a wire ring to which the bottom edge of the annular side wall is secured, and lines of stitching preventing the aforesaid slits from being extended farther than intended.

4. In a sanitary combined rodent and insect exterminator, the combination of a base, a central lure compartment, encircling bait compartments, said compartments being partitioned to permit of using different kinds of bait for rodents in the aforesaid compartments, said compartments having openings to permit access to the bait, an outer compartment for liquid insecticide, a canopy over the entire device, means for supporting the canopy, vents opening out of the top of the canopy, a metal cover having a central slot to permit of placing the device over the canopy a metal annular side wall, said annular side wall having doorways for the entrance of rodents, and hinged doors hingedly mounted at the top of the doorways to permit rodents to pass in and out of the device.

5. In a sanitary combined rodent and insect exterminator, the combination of a base, straps integral with the base for securing the device to the ground or floor, said straps having raised ends, a central compartment for lure for rodents, a series of outer compartments for poison bait for rodents, an additional compartment for liquid insecticide for insects, a canopy covering the entire device except the anchoring straps, vents opening out of the top of the canopy, a cover comprising a cone-shaped top having a central slot, and an annular side wall member connected with said cone-shaped top, said side wall member having openings to permit of the entrance of rodents to the interior of the device, the cover having slots adapted to be engaged by the ends of the anchoring arms of the base to retain the cover in place.

6. In an exterminator of the type described, the combination of a base, means for attaching said base to a floor or the ground, a central lure compartment, a plurality of bait compartments separate from the lure compartment for poison bait for rodents, a canopy supported above and covering the entire device, vents for the canopy positioned over the lure compartment, a cover member substantially covering the canopy and having an annular side wall enclosing the device, said side wall having openings for the ingress and egress of rodents.

7. In an exterminator of the type described, the combination of a base, means for attaching said base to a floor or the ground, a central lure compartment, a plurality of bait compartments separate from the lure compartment for poison bait for rodents, a canopy supported above and covering the entire device, vents for the canopy positioned over the lure compartment, a fabric cover having a depending annular side wall said fabric side wall having vertical slits, a wire ring to which the bottom edge of the fabric side wall is secured, and annular lines of stitching preventing the vertical slits from being spread farther than intended, said slits being adapted to permit the entrance of rats and exclude chickens.

8. In an exterminator of the type described, the combination of a base, means for attaching said base to a floor or the ground, a central lure compartment, a plurality of bait compartments separate from the lure compartment for poison bait for rodents, a canopy supported above and covering the entire device, vents for the canopy positioned over the lure compartment, a metal cover having a central slot, an annular side wall integral with the metal cover, spaced openings in the annular side wall, and hinged doors in said openings swingably both outwardly and inwardly.

9. In an exterminator of the type described, the combination of a base, means for attaching said base to a floor or the ground, a central lure compartment, a plurality of bait compartments separate from the lure compartment for poison bait for rodents, a canopy releasably supported above and covering the entire device, a cover having a central slot, an annular side wall integral with the cover and spaced openings for rodents in the annular side wall.

EDWARD L. WATSON.